(12) United States Patent
Friel et al.

(10) Patent No.: US 8,599,235 B2
(45) Date of Patent: Dec. 3, 2013

(54) AUTOMATIC DISPLAY LATENCY MEASUREMENT SYSTEM FOR VIDEO CONFERENCING

(75) Inventors: Joseph T. Friel, Ardmore, PA (US); Philip R. Graham, Milpitas, CA (US); Richard T. Wales, Sunnyale, CA (US); Tor A. Sundsbarm, San Jose, CA (US); Paul J. Randall, Pleasant Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 822 days.

(21) Appl. No.: 12/509,870

(22) Filed: Jul. 27, 2009

(65) Prior Publication Data

US 2011/0018959 A1    Jan. 27, 2011

(51) Int. Cl.
*H04N 7/14*    (2006.01)

(52) U.S. Cl.
USPC ........................................ 348/14.01; 382/100

(58) Field of Classification Search
USPC .......................... 370/412, 260; 709/224, 231; 348/14.01–14.08, 14.09
See application file for complete search history.

(56) References Cited

U.S. PATENT DOCUMENTS

| 5,511,003 | A  | * | 4/1996  | Agarwal ........................ 709/204 |
| 5,986,568 | A  | * | 11/1999 | Suzuki et al. .................. 455/517 |
| 2002/0027975 | A1 | * | 3/2002  | Oxley .............................. 379/45 |
| 2002/0067803 | A1 | * | 6/2002  | Antonucci et al. ............. 379/45 |
| 2003/0012344 | A1 | * | 1/2003  | Agarwal et al. ................. 379/37 |
| 2003/0091159 | A1 | * | 5/2003  | Oxley .............................. 379/38 |
| 2005/0141676 | A1 | * | 6/2005  | Andrew .......................... 379/45 |
| 2008/0044160 | A1 | * | 2/2008  | Maegaki ......................... 386/96 |
| 2008/0084900 | A1 |   | 4/2008  | Dunn |
| 2009/0041257 | A1 | * | 2/2009  | Yoshizawa et al. ............. 381/59 |
| 2009/0058986 | A1 | * | 3/2009  | Beers et al. ................. 348/14.08 |
| 2009/0067584 | A1 | * | 3/2009  | Waters et al. ................... 379/45 |
| 2009/0070146 | A1 | * | 3/2009  | Haider et al. ..................... 705/3 |

OTHER PUBLICATIONS

Marc Olano, Jon Cohen, Mark Mine, Gary Bishop, Department of Computer Science, UNC Chapel Hill, Combatting Rendering Latency, 1995.

* cited by examiner

*Primary Examiner* — Maria El-Zoobi
(74) *Attorney, Agent, or Firm* — Edell, Shapiro & Finnan, LLC

(57) ABSTRACT

Methods and systems that compensate for display latency when separate speakers are used during video conferencing. A method includes determining whether speakers, which are not controlled by a display, are to be used in connection with a video conferencing session. The method further includes sending, to the display, data that causes the display to generate a predetermined pattern, capturing imagery of the effects of the predetermined pattern shown on the display, calculating a latency of the display based on a difference in a time the data was sent and the imagery of the effects is received, and storing a value of the latency of the display in a device that enables the video conferencing. When the speakers, which are not controlled by the display are selected, are selected, the audio portion of the video conferencing session is redirected to those speakers, but delayed for an amount of time substantially equivalent to the value of the latency of the display. In this way audio and video synchronization may be improved.

16 Claims, 5 Drawing Sheets

AUTOMATIC DISPLAY LATENCY MEASUREMENT SYSTEM FOR VIDEO CONFERENCING

TECHNICAL FIELD

The present disclosure relates to an automatic process for determining and compensating for the latency of a display that is used in a video conferencing system.

BACKGROUND

As the "global economy" continues to expand, so does the need to be able to communicate over potentially long distances with other people. One area of communication that has seen steady growth and increased customer confidence is the use of the Internet and other networking topographies. With the constant growth and development of networking capabilities has come the ability to implement more and better products and features. One area in particular that has seen growth and development in both quantity and quality is the area of Internet enabled phone calls, using, for example, voice over Internet Protocol (VoIP). By taking audio signals (the speaker's voice) and converting them into Internet Protocol (IP) packets, IP phones are able to send the audio signals over IP networks, such as the Internet. Another technology enabled by the Internet is video conferencing. Similar to Internet enabled phone calls, Internet enabled video conferencing is enabled by converting both the audio and video data for the video conference into IP packets that are sent between the endpoints.

User experience associated with video conferencing is sometimes mixed. While the ability to see the (geographically distant) person with whom one is speaking is often desirable, latency, inherent in one or more of the devices that support video conferencing, can detract from normal conversation.

DESCRIPTION OF EXAMPLE EMBODIMENTS

Overview

A method in accordance with an embodiment described herein includes determining whether speakers, which are not controlled by or associated with a display, are to be used in connection with a video conferencing session. The method then further includes sending, to the display, data that causes the display to generate a predetermined pattern, capturing imagery of the effects of the predetermined pattern shown on the display using a camera, calculating a latency of the display based on a difference in a time the data was sent and the time the imagery of the effect is received, and storing a value of the latency of the display in a network device that enables the video conferencing.

Then, if and when the speakers, which are not controlled by or associated with a display, are selected for use for the video conferencing session, the audio portion of the video conference is redirected from the display to the separate speakers, and thereafter delayed by an amount substantially equal to the value of the latency of the display. In this way, the video and audio portions of the video conferencing session are better synchronized.

Figure 1:
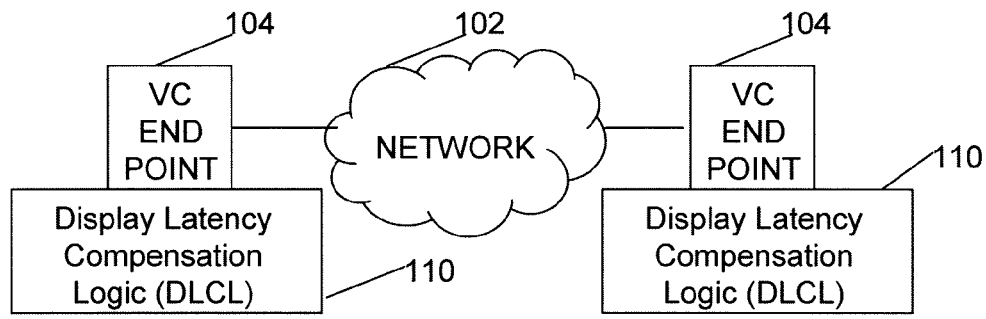
FIG. 1 shows two videoconference endpoints connected via a network in accordance with an embodiment.

FIG. 1 shows two video conferencing endpoints 104 connected via a network and including display latency compensation logic 110 in accordance with an embodiment. As will be shown with more specificity in FIGS. 2 and 3, an endpoint 104 could comprise a set-top-box (STB) of an in-home cable network system. However, the use of an STB is not required, and other devices that can communicate via a network 102 may also be employed. Further, those skilled in the art will appreciate that display latency compensation logic 110 need only be implemented at one end point, as this logic is concerned with "local" display latency, rather than, e.g., network latency.

Although the system and methodologies in accordance with embodiments described herein may be used in a commercial/business setting, it is often the case that business video conferencing facilities are set up professionally, and as a result, there is less likelihood that unknown latencies in the system will impact user experience. Thus, embodiments may be particularly suited to consumer/home video conferencing applications.

Referring again to FIG. 1, network 102 represents communication equipment, including hardware and any appropriate controlling logic, for interconnecting elements coupled to network 102 and facilitating communication between video conference endpoints 104. Network 102 may include a plurality of segments and nodes that facilitate coupling of video conference endpoints 104 with one another. Video conference endpoints 104 may also include or be associated with any combination of network components, session border controllers, gatekeepers, call managers, conference bridges, routers, hubs, switches, gateways, edge points, or any other hardware, software, or embedded logic implementing any number of communication protocols that allow for the exchange of packets through network 102.

Network 102 may include one or more local area networks (LANs), metropolitan area networks (MANs), wide area networks (WANs), any other public or private networks, local, regional, or global communication networks, enterprise intranets, other suitable wireline or wireless communication links, or any combination of the preceding. Generally, network 102 provides for the communication of packets, cells, frames, or other portions of information between video conference endpoints 104. While only two video conference endpoints 104 are depicted, network 102 may support any number of endpoints, segments and nodes.

More specifically, network 102 may employ voice communication protocols that allow for the addressing or identification of endpoints and/or nodes coupled to network 102. For example, using Internet protocol (IP), each of the components coupled together by network 102 may be identified using IP addresses. In this manner, network 102 may support any form and/or combination of point-to-point, multicast, unicast, or other techniques for exchanging packet communications among components coupled thereto. Any network components capable of exchanging audio, video, or other data using frames or packets may be employed.

In an example embodiment of operation, users at video conference end points 104 may desire to engage in a video conference with each other. One of those users may initiate the video conference by dialing a telephone number of the other user or entering an IP address associated with a network interface device at the other end point (e.g., STB 202, see FIG. 2). Once a connection is established, the two end points may exchange information such as available bandwidth, network latency, etc., as is well-known in the art.

While, as note above, commercial or business video conferencing is often implemented with professionally configured components, consumer video conferencing may inject certain unknowns in the overall system. Specifically, and now with reference to FIG. 2, a typical consumer video conferencing configuration might include a set-top-box (STB) 202 that is connected to network 102. The STB 202 is in communication with a display 204, such as a digital television, having its own set of speakers 206. In this case, the STB 202 and the display 204 may be in communication with each other via an HDMI interface. To enable video conferencing, also in communication with the STB 202 are a camera 208, such as a digital camera, and a microphone (MIC) 210. Typically, the camera is arranged to point in the same direction in which the display is arranged to point. With the indicated components a user at video conference end point 104 shown if FIG. 2 can view and hear the other end point via display 204 and speakers 206. Likewise, the other end point can receive video and audio data generated by camera 208 and MIC 210, thus establishing a full video conferencing environment. It is noted that the use of an STB is not required, and other components, such as computers or other devices, that can enable the functionality described herein may be employed.

Figure 2:
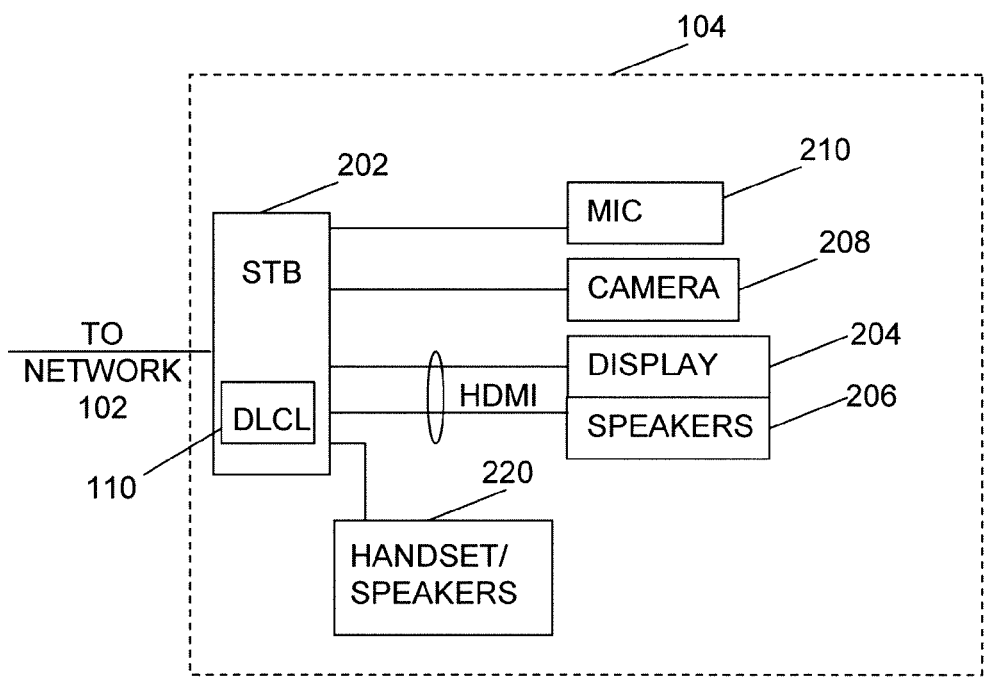
FIG. 2 depicts an arrangement of components at one of the end points in accordance with an embodiment.

As further shown in FIG. 2, it is possible that a user may elect to use a separate telephone handset and/or speaker 220 (such as a speaker associated with a home entertainment system) in combination with the user's own display. When this occurs, any built-in lip-synching functionality of the display 204 is bypassed, and there is no longer any assurance that the video being presented on the display is synchronized with the audio being played on the separate speakers or handset 220. Generally speaking, when such a combination of devices is used, the audio could be tens of milliseconds ahead of the video due to inherent latency in the display. Indeed, such latency may be on the order of 80 milliseconds in some cases.

Embodiments described herein provide an automated approach to synchronize audio and video data in the context of video conferencing when a user elects to use audio equipment that is not associated with or controlled by the display being used, and where a latency of the video display used for the video conferencing is unknown. Logic for providing display latency compensation, or in other words, for synchronizing audio and video portions of a video conference is shown by reference numeral 110 in FIG. 2 as well.

Figure 3:
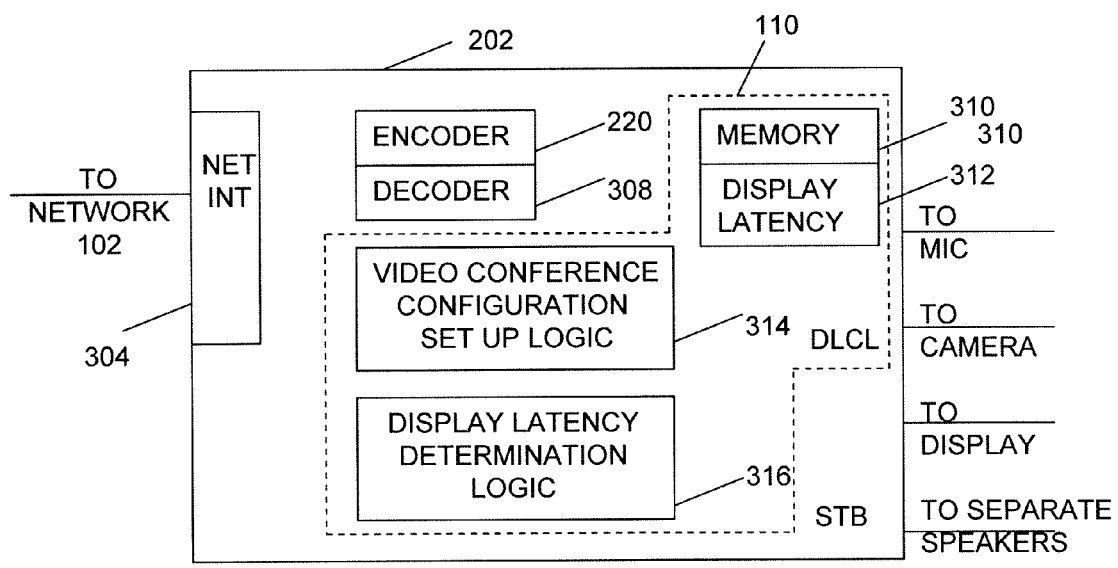
FIG. 3 shows an arrangement of components of a set-top-box in accordance with an embodiment.

FIG. 3 shows an arrangement of components of a set-top-box 202, including those for the display latency compensation logic 110, in accordance with an embodiment. STB 202 includes, among other things, a network interface device 304 for physically connecting to network 102. Of course, if the functionality described herein is not embodied in a STB, then there may not be a network interface device). STB 202 further includes an encoder 306 and decoder 308 for, respectively encoding and decoding data that is to be transmitted to and received from network 102. Also, a memory 310 is provided for storing various routines and processing functions of the STB 202. Shown separately, although it may be incorporated into the general memory 310, is a memory location for display latency 312 of the display being used in the video conferencing system at one end point 104. As will be explained later herein, a value of the display latency is automatically calculated and stored for later use in the event the user employs speakers or a telephone handset 220 that is separate from (i.e., not controlled by) the display 204.

As part of a consumer video conferencing system enabled by a consumer device such as an STB 202, there is typically a video conferencing configuration set up routine 314. That routine might ensure that all of the devices necessary to enable video conferencing (e.g., like those shown in FIG. 2) are properly connected to the STB 202. That routine might also set microphone levels and default volume, among other things. As shown in FIG. 3, display latency determination logic 316 in accordance with an embodiment could also be integrated with the conventional configuration logic 314. Display latency determination logic 316 is described with reference to FIGS. 4 and 5 and provides an automated method for obtaining a value of latency for a display that is used in a video conferencing context, and which latency value can then be used to compensate for that latency when speakers not associated with the display are used.

Figure 4:
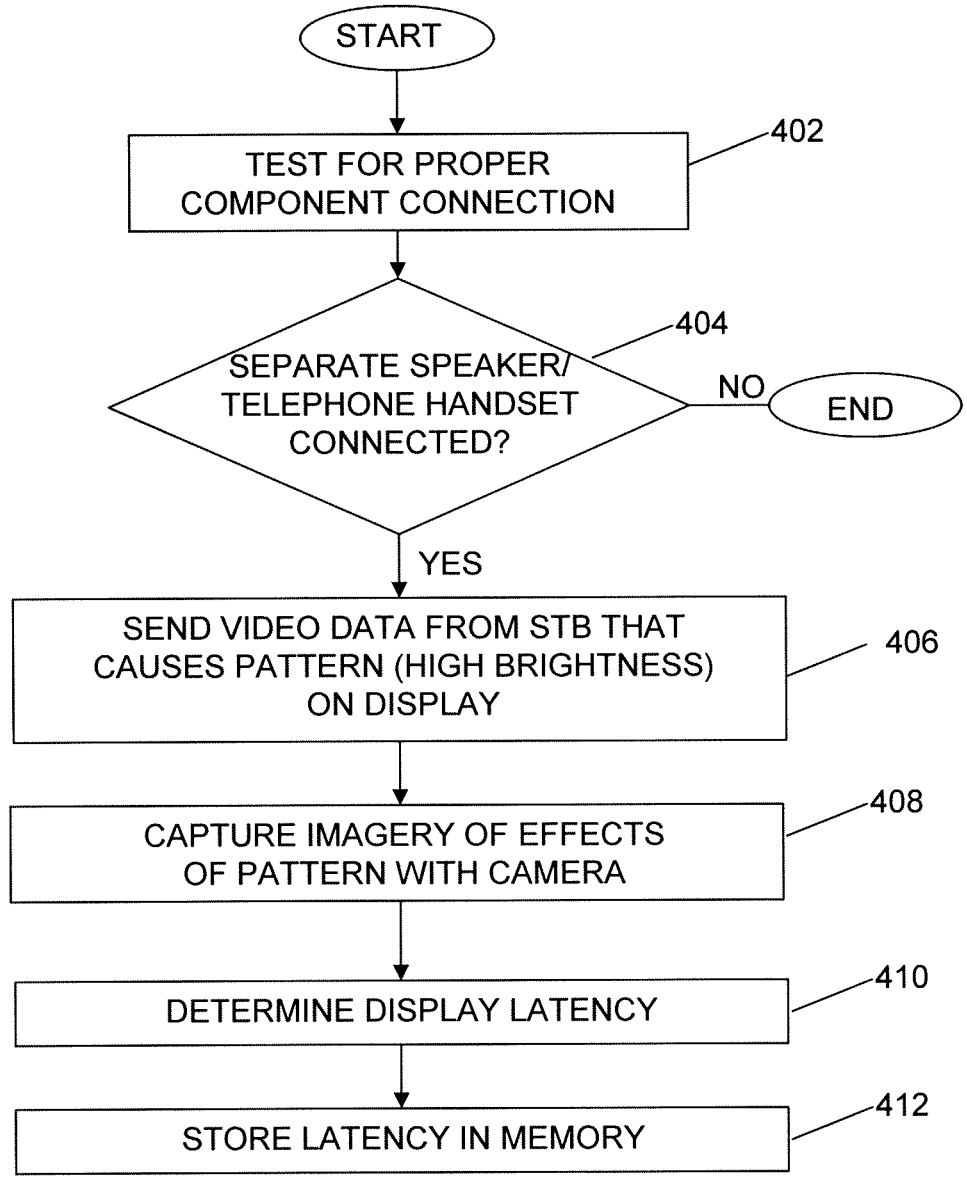
FIG. 4 is a flow chart that depicts an automatic display latency determination routine in accordance with an embodiment.

The process of FIG. 4, which is encoded in logic 314, begins with Step 402 in which a test is performed to determine if the STB 202 (or other network access device, or still other device) is connected to the several video conferencing enabling devices. This step can be accomplished with well-known hand shaking techniques, or simply by determining whether anything at all is connected to the respective ports/jacks on STB 202 to which such enabling devices would be connected. At Step 404, a determination is made as to whether separate speakers or a telephone handset (e.g., speakerphone, or Polycom™ type device) 220 is also connected to the STB 202. If no such device is connected, then the process may end. However, the process may, alternatively, continue, since it is possible that a separate speaker 220 may be later connected. In yet another alternative, the display latency determination logic 316 is initiated only when a separate speaker 220 is detected by the STB 202. This might even occur during an on-going video conference.

Figure 5:
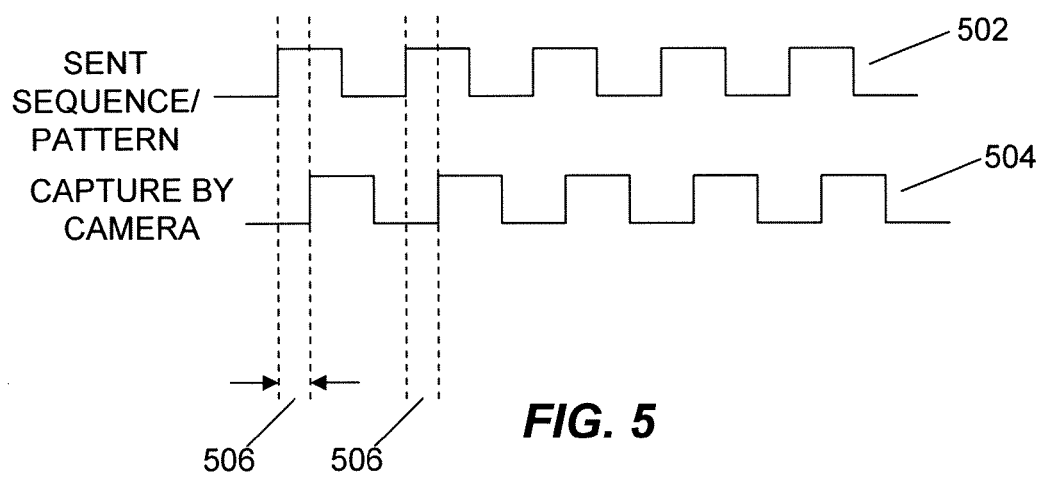
FIG. 5 shows a timing diagram in connection with calculating a display latency in accordance with an embodiment.

If a separate speaker 220 (again, one not under the control of the display 204) is connected to the STB 202, then at Step 406 the STB 202 sends video data to cause a series of (or a single) bright flashes or strobes (predetermined imagery) on the display. At Step 408, the camera 208 captures the effects (e.g., brightening of a room) of the flashes, strobes (or other predetermined pattern or imagery) and passes the captured imagery back to STB 202. With reference now to FIG. 5, a timing diagram shows a sent flash sequence 502 in the form of a square wave (although other patterns can be used) that causes the display to brighten in a definitive pattern. The camera 208 then captures the increased brightness, also in the pattern of, in this case, a square wave 504. This increased brightness is the effect of the flash. By knowing the latency of the camera and the time that it takes for the sent pattern 502 to reach the display 204 and the time it takes for the camera 208 to return the imagery back to the STB 202 for processing, it is possible to calculate the latency 506 of the display 204, namely the time it takes for the display to present what is sent to it. This calculation is carried out in Step 410 of FIG. 4. In one possible implementation, each of the frames of the incoming video from the camera is monitored to detect when the flash or strobe occurred. At Step 412, the value of the display latency 506, e.g., 10-80 milliseconds, is stored in memory location 312.

Once the STB 202 has stored the latency value, and a user chooses to use separate speakers 220, the overall system will be able to delay the audio supplied to the separate speakers for a time substantially equivalent to the display latency thereby better synchronizing the audio and video portions of the video conferencing data.

Figure 6:
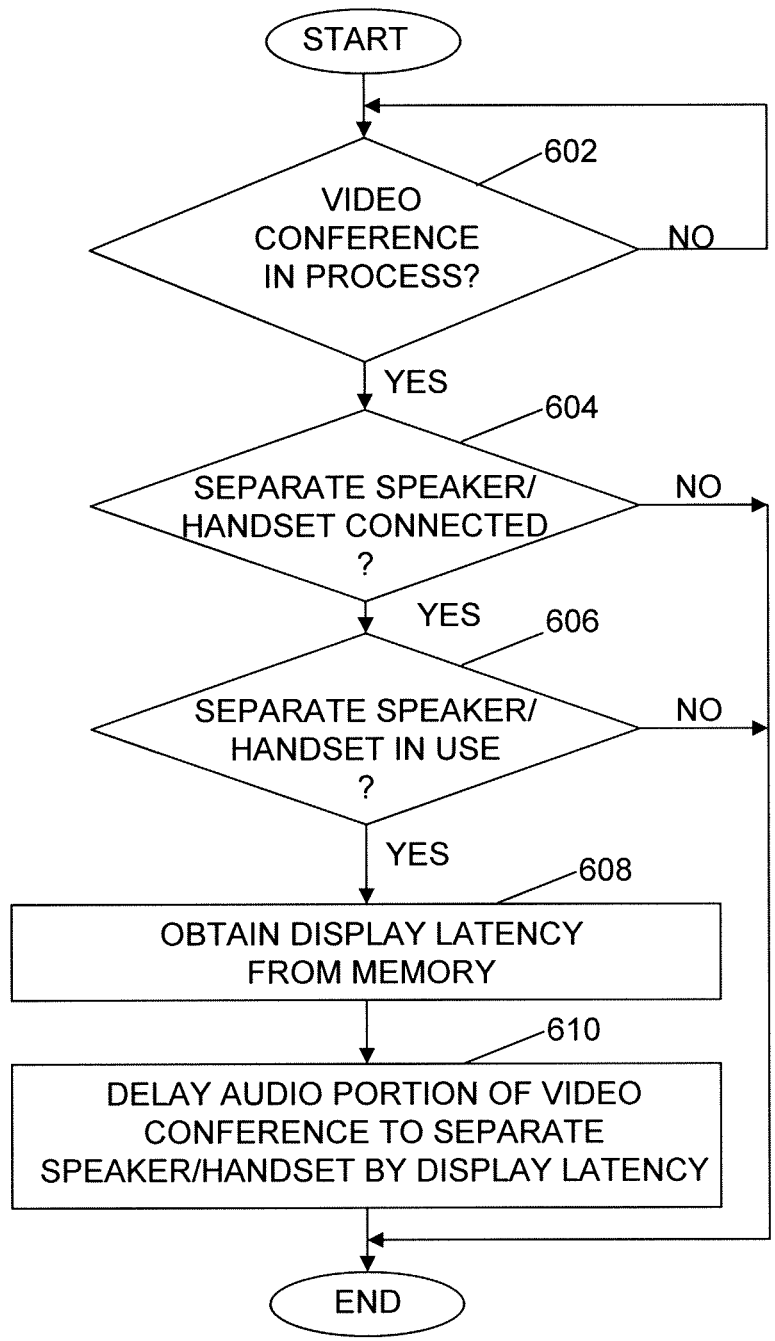
FIG. 6 is a flow chart that depicts a scenario where a previously-calculated display latency is employed to adjust audio timing to synchronize audio and video portions of a video conference in accordance with an embodiment.

More specifically, and referring now to FIG. 6, at Step 602 it is determined whether a video conference is in process. If yes, then at Step 604 it is determined whether separate speakers (not under the control of the display) are connected to the system. If no separate speakers are connected, then the videoconferencing process proceeds conventionally. If separate speakers are connected, then at Step 606 it is determined whether those separate speakers are in use. If those speakers are in use, then the audio portion of the video conference is redirected (e.g., by the STB 202) from the display (and its speaker(s)) to the separate speakers. As such, it is not unlikely that there will be a synchronization problem between the audio and video portions of the video conferencing data being played and shown, as a result of the inherent latency of the display. To correct this problem, at Step 608, the display latency is obtained from the memory location in which it was previously stored, e.g., during the configuration operation described above. Then, at Step 610, that value of latency is applied to the incoming audio to delay the audio for a time substantially the same as the latency of the display before the audio is sent to the separate speakers 220. The delay may be implemented using well-known buffering techniques, for example.

In one embodiment, the STB (or, again, other network or video conferencing enabling device) monitors whether a telephone handset has been taken off hook. When an off hook status is detected, the audio portion of the video conference may then be redirected to the handset. That is, if a user wants increased privacy, the user can simply "pick up the phone" and, in accordance with embodiments, will not experience lip synching problems between what is heard on the phone and what is seen on the display.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method, comprising:
   determining whether a speaker, which is not controlled by a display, is to be used in connection with a video conference, in contrast to a speaker controlled by the display;
   sending, to the display, data that causes the display to generate predetermined imagery;
   capturing, with a camera, an effect of the predetermined imagery;
   calculating a value of latency of the display based on a difference in a time the data was sent and the effect was captured by the camera; and
   storing the value of the latency of the display in a device that enables the video conference; and
   obtaining the value of the latency of the display and delaying an audio signal to the speaker, which is not controlled by the display, by an amount of time substantially equivalent to the value such that audio and video portions of the video conference are substantially synchronized.

2. The method of claim 1, further comprising detecting whether the speaker, which is not controlled by the display, is in use.

3. The method of claim 1, wherein the predetermined imagery comprises a flash or strobe.

4. The method of claim 3, wherein the predetermined imagery comprises a series of flashes or strobes.

5. The method of claim 1, wherein calculating comprises detecting frames of imagery captured by the camera.

6. The method of claim 1, further comprising redirecting an audio portion of the video conference from the display to the speaker.

7. The method of claim 1, further comprising performing the method during a video conference configuration set up routine.

8. A method, comprising:
   determining whether a video conference is in process;
   determining whether a speaker, which is not controlled by a display used for the video conference, is connected to a device enabling the video conference;
   determining whether the speaker, which is not controlled by the display used for the video conference, has been selected for use;
   obtaining a value of display latency of the display from a memory location within a device enabling the video conference wherein the value of display latency is derived by running an automated routine to calculate the value of the display latency wherein the automated routine comprises:
   sending, to the display, data that causes the display to generate predetermined imagery;
   capturing an effect of the predetermined imagery; and
   calculating the value of the display latency based on a difference in a time the data was sent and the effect was received; and
   delaying an audio portion of the video conference that is redirected from the display used for the video conference to the speaker, which is not controlled by the display used for the video conference, by an amount of time substantially equivalent to the value of the display latency.

9. The method of claim 8, further comprising detecting the presence of the speaker by monitoring whether a connection has been made to an audio output port of a device enabling the video conference.

10. The method of claim 8, further comprising storing the value of the display latency in the memory location during a video conference configuration set up routine.

11. The method of claim 8, wherein the predetermined imagery is a flash or strobe.

12. The method of claim 11, wherein the predetermined imagery comprises a series of flashes or strobes.

13. The method of claim 8, wherein calculating comprises detecting frames of imagery captured by a camera.

14. An apparatus, comprising:
   a device configured to be connected to a network, a video display, a camera, and a speaker, wherein the speaker is not controlled by the video display;
   the device comprising logic configured to automatically determine a value of latency of the video display and to thereafter delay an audio portion of a video conference by an amount of time substantially equal to the value of the latency when the audio portion of the video conference is directed the speaker, wherein the value of latency is derived by:
sending, to the video display, data that causes the video display to generate predetermined imagery;
capturing an effect of the predetermined imagery; and
calculating the value of the latency based on a difference in a time the data was sent and the effect was received at a time of the capturing.

15. The apparatus of claim 14, wherein the device is a set-top-box.

16. The apparatus of claim 14, wherein the device is configured to detect whether the speaker, which is not controlled by the video display, is selected by a user instead of a speaker controlled by the video display.

* * * * *